United States Patent
Shusta et al.

(10) Patent No.: US 6,416,188 B1
(45) Date of Patent: Jul. 9, 2002

(54) DIELECTRIC MIRROR RETROREFLECTIVE APPLIQUES HAVING EXCELLENT REPETITIVE LAUNDERING PERFORMANCE

(75) Inventors: Jeanine M. Shusta, Mahtomedi; Norman D. Ligtenberg, Cottage Grove; William B. Robbins, Maplewood, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/546,161

(22) Filed: Apr. 11, 2000

(51) Int. Cl.[7] ............................................. G02B 5/128
(52) U.S. Cl. ....................... 359/536; 359/538; 359/540; 428/204; 428/207
(58) Field of Search ......................... 359/518, 534–542; 428/325, 331, 913, 204, 207

(56) References Cited

U.S. PATENT DOCUMENTS

| | | | |
|---|---|---|---|
| 3,700,305 A | | 10/1972 | Bingham ..................... 359/540 |
| 4,102,562 A | * | 7/1978 | Harper et al. ................ 359/518 |
| 4,763,985 A | | 8/1988 | Bingham ..................... 359/541 |
| 5,645,938 A | | 7/1997 | Crandall |
| 5,674,605 A | | 10/1997 | Marecki ..................... 359/538 |
| 5,837,347 A | | 11/1998 | Marecki ..................... 359/540 |

FOREIGN PATENT DOCUMENTS

WO    WO 97/15848    5/1997

OTHER PUBLICATIONS

ASTM Standard Method E808–99, "Standard Practice For Describing Retroreflection", Apr. 1999.

* cited by examiner

*Primary Examiner*—James Phan
(74) *Attorney, Agent, or Firm*—Steven C. Jensen

(57) ABSTRACT

Exposed lens retroreflective appliques incorporate a monolayer of beads and a dielectric mirror proximate the beads. A pigmented or otherwise colored bead bond layer in which the beads are partially embedded is visible through the dielectric mirror, giving the article a highly colored daytime appearance. The appliques exhibit an initial reflectivity. By appropriate materials selection, the appliques can be made to retain at least 75%, and in most instances at least 90%, of the initial reflectivity if subjected to fifty home laundering cycles. In one case the dielectric mirror includes zinc sulfide as a relatively high refractive index material and calcium fluoride as a relatively low refractive index material. In another case the dielectric mirror includes zinc sulfide as the relatively high refractive index material and silicon dioxide as the relatively low refractive index material.

14 Claims, 8 Drawing Sheets

Atlanta1996

DIELECTRIC MIRROR RETROREFLECTIVE APPLIQUES HAVING EXCELLENT REPETITIVE LAUNDERING PERFORMANCE

BACKGROUND

The present invention relates generally to launderable retroreflective products for use in personal articles such as articles of clothing. More particularly, the invention relates to retroreflective appliques that use a dielectric mirror to assist in retroreflection and to permit the applique to exhibit a variety of daytime colors.

The reader is directed to the glossary at the end of the specification for guidance on the meaning of certain terms used herein.

The use of retroreflective materials (sometimes referred to in the literature as reflective materials) such as retroreflective appliques to increase the visibility of pedestrians has long been known. Such materials have the property of reflecting incident light, such as light from a vehicle headlamp, back in the general direction from which the light originated, regardless of the angle at which the incident light impinges on the surface of the material. Thus, a person wearing such a material can be highly visible to drivers of such vehicles at night, depending on (i) the amount of retroreflective material used, and (ii) the reflectivity of the material.

The retroreflectivity is provided by a multitude of reflective facets arranged as cube corner elements, or, more commonly, by a layer of tiny glass beads or microspheres that cooperate with a specularly reflective material that is referred to herein as a mirror. In the latter case, the beads are partially embedded in a binder layer that holds the beads to a fabric or other substrate material, and partially exposed to the atmosphere. Incident light enters the exposed portion of a bead and is focused by the bead onto the mirror, which is disposed at the back of the bead embedded in the binder layer, whereupon the light is reflected back through the bead, exiting through the exposed portion in a direction opposite to the incident direction. This type of construction is referred to as "exposed lens", because it uses microspheres with portions that are exposed to the atmosphere.

In exposed lens retroreflective appliques, a simple aluminum coating is the most commonly used mirror. Aluminum provides the article with good reflectivity for densely packed beads, and has good durability, but the aluminum is opaque to visible light and renders a "gray-cast" daytime appearance. In applications where it is important that the applique exhibit other daytime colors, it is known to provide a dielectric layer or layers as the mirror. See, e.g., U.S. Pat. No. 3,700,305 (Bingham) or U.S. Pat. No. 4,763,985 (Bingham). The dielectric layer is partially reflective and partially transmissive to visible light. This characteristic permits the article to exhibit color by use of a colored binder layer or, if the binder layer is colorless, by use of a colored barrier coat, fabric, or other substrate. The color of the binder layer, fabric, or substrate is visible not only in the small spaces that may exist between neighboring beads, but also through the beads themselves.

Examples of known exposed lens dielectric mirror appliques will now be described with the aid of FIGS. 1a–d. In FIG. 1a, a monolayer of beads 10, also commonly referred to as microspheres, has been formed on a temporary carrier layer 12. The beads 10 are typically made of glass or ceramic, and have a refractive index of nominally about 1.9 but that can range from about 1.7 to 2.0. The beads typically have diameters of about 30 to 200 $\mu$m, but the size of the beads is not considered critical. The beads 10 have been cascaded onto the carrier to form a monolayer of beads partially embedded in the carrier. In FIG. 1a, the carrier 12 is shown as a two-layer construction that consists of an upper layer 12a, in which the beads are partially embedded, and a lower layer 12b. The upper layer 12a is made of a heat-softenable composition to permit easy removal of the carrier 12 after application. In one known embodiment, layer 12a consists of polyethylene, and layer 12b consists polyethylene teraphthalate (PET). In another known embodiment, layer 12a consists of polyethylene and layer 12b consists of paper. A dielectric mirror is then formed on the exposed portions of the beads 10 by first depositing a layer 14 of sodium aluminum fluoride ($Na_3AlF_6$, also known as cryolite), followed by a layer 16 of zinc sulfide (ZnS). Cryolite has a typical refractive index of about 1.34 in the visible spectrum, which is low relative to the refractive index of ZnS, which is typically about 2.35. The optical thickness (i.e., the physical thickness multiplied by the refractive index) of each layer 14, 16 is approximately one-quarter wavelength of visible light for optimal reflective performance.

Next, as shown in FIG. 1b, a layer of bead bond material 18 is applied to the dielectric mirror formed by the layers 14,16. The bead bond layer maintains the integrity of the monolayer of beads 10 when the carrier 12 is later removed. An example of a known bead bond material 18 is a fluorescent colored polyester urethane.

To produce a finished transfer sheet, a polyurethane barrier coat layer 20 and a transfer adhesive layer 22 are applied in sequence as shown in FIG. 1c. The barrier coat layer 20 includes certain pigments to help provide the desired daytime color. The transfer adhesive layer 22 is a heat activated polyester adhesive so that the applique can easily be applied to a substrate of interest.

In FIG. 1d, the transfer sheet of FIG. 1c has been applied to a fabric 24 by application of pressure and heat, and the carrier 12 is shown being removed to expose the lower portions of the beads to air, thus permitting the applique to retroreflect light that is incident from below (from the perspective of FIG. 1d).

The applique just described can be sold in transfer sheet form (FIG. 1c) or instead in the more finished form of FIG. 1d.

Another known exposed lens retroreflective applique is similar to that just described, except the bead bond layer 18 is a printable ink such as plastisol ink that functions not only as bead bond but also as a transfer adhesive, so that layers 20 and 22 are omitted. Further, such plastisol ink bead bond layer 18 can be screen printed in an image-wise pattern on the exposed portions of some beads 10 but not of others, after the dielectric mirror has been formed on the beads. FIG. 2 shows an example of a graphic 26 useable as the image-wise pattern for the applique. This type of applique is sometimes referred to in the art as a "transfer graphic". Plastisol inks that are used for this purpose are available from Plast-O-Meric Inc. (a subsidiary of The Geon Company, Avon Lake, Ohio) under item series SX864.

In known transfer graphic appliques, the bead bond 18 can be printed in an organic solvent-free form and then gelled by applying heat for a short period of time. This gelled state results from partial dissolution of the particles in the plasticizer and partial coalescence of the particles to form a weak image-wise film that is generally dry to the touch and can withstand mild rubbing without smearing. Once in the gelled state, the further application of heat during lamination causes the gelled plastisol to temporarily soften and flow and/or penetrate a desired substrate, such as fabric 24. During this process the particles are further dissolved by the plasticizer, and upon cooling, they are fused into a rugged image-wise film.

Transfer graphic appliques can be sold in transfer sheet form without bead bond (FIG. 1a), in a kit comprising such a transfer sheet and a separate supply of printable ink bead bond material, or instead in the more finished form of FIG. 1d.

If the image-wise bead bond layer 18 is applied in the form of graphic 26 (FIG. 2), then once the carrier 12 is removed, the beads 10, dielectric mirror 14,16, and bead bond material 18 remain adhered to the substrate in the shape of the image-wise pattern or graphic 26. In those areas, the applique provides retroreflection of incident light under suitable nighttime lighting conditions, and provides daytime color by virtue of the dielectric mirror and colored bead bond material 18 under diffuse lighting conditions.

Often, exposed lens retroreflective appliques are applied to substrates that in use are subjected to repeated laundering. This category of substrates generally includes most articles of clothing. An extreme example is a fireman's jacket that tends to get badly soiled on a frequent basis. Unfortunately, exposed lens dielectric mirror appliques have long beep known to exhibit a reflectivity that degrades from an initial value much more rapidly under repetitive laundering conditions than aluminum mirror appliques of like construction. For example, U.S. Pat. No. 5,837,347 (Marecki) describes an exposed lens dielectric mirror construction in Example 42 thereof that retains barely more than one-fourth of its initial reflectivity after 50 washings, and yet is characterized as a dramatic improvement over prior constructions. It is known that the amount of degradation can depend upon factors such as the composition and thickness of bead bond material used, the manner in which the bead bond is cured, and even the type of temporary carrier used (since it can impact the bead bond curing process). Nevertheless, testing has shown that typical exposed lens dielectric mirror appliques retain from about 5% to a maximum of only about 50% of their initial reflectivity after about 50 home laundering cycles.

Furthermore, currently available exposed lens dielectric mirror appliques, which use cryolite as a low index material, have a repetitive home laundering performance that varies considerably from lot to lot even for samples processed under seemingly identical conditions.

Therefore, an exposed lens dielectric mirror applique that could consistently exhibit excellent reflectivity retention even under repetitive home laundering conditions would be highly desirable.

BRIEF SUMMARY

The present inventors have discovered that using certain materials in the construction of the dielectric mirror in an exposed lens retroreflective applique can have a drastic and unexpected effect on the applique's retained reflectivity under repetitive laundering conditions. For example, reflectivities of at least about 75% of an initial reflectivity, and even about 90% or greater, are achievable after as many as fifty home laundering cycles.

This application describes exposed lens retroreflective appliques that incorporate a dielectric mirror. The appliques exhibit an initial reflectivity. By appropriate materials selection, the appliques can be made to consistently retain at least about 75%, and in some instances greater than about 90%, of the initial reflectivity after fifty home laundering cycles. Further, the appliques usually retain at least about 90% of their initial reflectivity after the first twenty-five home laundering cycles. In one embodiment, the dielectric mirror of the applique includes zinc sulfide as a relatively high refractive index material, and calcium fluoride as a relatively low refractive index material. In another embodiment, the dielectric mirror includes zinc sulfide as the relatively high refractive index material and silicon dioxide as the relatively low refractive index material.

BRIEF DESCRIPTION OF THE DRAWINGS

The invention will be described with the aid of the drawings, in which:

FIGS 1 a–d are a series of idealized sectional views of an exposed lens retroreflective applique in various stages of production or use, as described above;

In the drawings, the same reference symbol is used for convenience to indicate elements that are the same or that perform the same or a similar function.

DETAILED DESCRIPTION OF THE ILLUSTRATIVE EMBODIMENTS

The invention will be described by reference to a number of examples that were fabricated under various conditions. Some comparative examples are described first so that the excellence of the later-described inventive examples can be better appreciated.

In brief, each of the examples (both the comparative examples and the inventive examples) was a transfer graphic retroreflective applique whose initial reflectivity and stability under repetitive laundering conditions was tested by applying the applique to a fabric and then subjecting the transferred graphic applique to reflectivity tests and repeated launderings.

Figure 2:
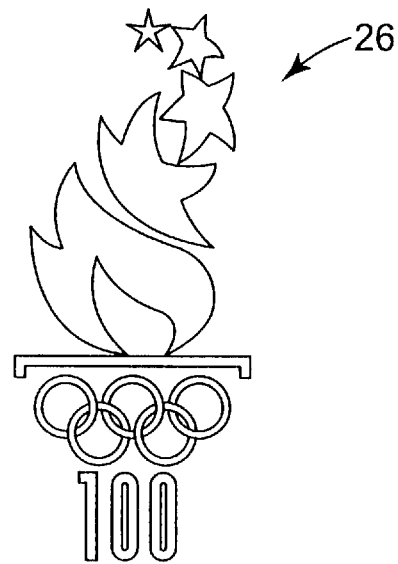
FIG. 2 is a plan view of an image-wise pattern useable with some appliques.

Unless otherwise noted, the temporary carrier layer 12 in each case consisted essentially of one layer 12a of polyethylene and a second layer 12b of PET. Zinc sulfide was used as a high refractive index material 16. Other materials were used as the low refractive index material 14. The high index layer and the low index layer had optical thicknesses that differed from one example to the next and even for different samples within the same example. Nevertheless, the thicknesses of these optical layers were adequate to provide the applique with a substantial amount of reflectivity for visible wavelengths of light. The bead bond material 18 was a blue-colored plastisol ink that was printed in the form of the image of FIG. 2 through a 110 T mesh/inch (43 T mesh/cm) polyester microfilament printing a screen with a medium hardness squeegee directly onto the freshly prepared dielectric mirror using an American M & M printer (Cameo 24 model, available through Wisconsin Automated Machinery Co., Oshkosh, Wis.). The blue plastisol ink was a 2:1 (by weight) mixture of cyan SX864B :magenta SX864B (both available from Plast-O-Meric Inc.), modified with approximately 4% by weight of N-β-(aminoethyl)-γ-aminopropyltrimethoxysilane as a coupling agent. The ink applied in this fashion was allowed to gel by passing the samples through a Texair™ Model 30 continuous belt tunnel (available from American Screen Printing Equipment Co., Chicago, Ill.) with an infrared panel setting of about 1100° F. (about 593° C.), with the forced air thermostat set to the off position, and using a belt temperature of about 230° F. (about 110° C.).

Each exposed lens retroreflective applique so constructed was then allowed to cool to room temperature, and then placed with the gelled, image-wise bead bond layer against a 65/35 polyester/cotton blend Excellerate brand fabric and laminated thereto using a HIX type N-800 heat lamination press (available from HIX Corp., Pittsburg, Kans.) at about 340° F. (about 171° C.) for about 20 seconds. The pressure in the air line feeding the heat lamination press was set at about 40 psi (about 275 kPa), which also represents the pressure at the platen. After cooling to room temperature, the carrier layer was removed from the construction and the resulting blue-colored appliques were measured for initial reflectivity (in units of cd/(lux·m$^2$)) at 0.2 degrees observation angle and –4 degrees entrance angle.

Each applique was then subjected to at least twenty-five home laundering cycles. A drying cycle (see glossary infra under "home laundering cycle") and reflectivity measurement was performed after every 5 consecutive wash/rinse cycles. The ballast towels used for the laundering cycles were approximately 50 by 100 cm sheets of 100% cotton and having a weight of about 250 g/m$^2$ (about 7.4 oz/yd$^2$), such towels being available from Langheinrich (6407 Schlitz, Germany) under the designation 100% Baumwolle, Qualitat 7068, Gerstenkornhandtuecher. In some cases testing continued for a total of fifty home laundering cycles. In those cases, the drying cycle and reflectivity measurement corresponding to the 35$^{th}$ and 45$^{th}$ consecutive wash/rinse cycle was generally omitted. Relative reflectivity of each applique was calculated by dividing the measured reflectivity by the initial reflectivity, and expressed as a percentage of initial.

Each separate sample or example referred to below actually consisted of a minimum of three (and in some cases as many as five) individual graphic images each about 4.5 by 8 inches (about 11.5 by 20 cm) in the form of graphic 26 (FIG. 2), which were arranged at different locations on a single piece of the Excellerate brand fabric substrate. Each reported measurement is an average of the three, four, or five individual images as applicable.

COMPARATIVE EXAMPLES

Comparative Examples 1, 2, 3, and 4

Figure 1A:
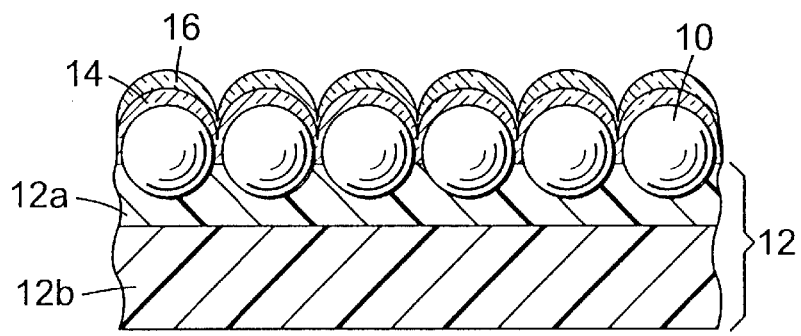
FIGS. 1a–d are not intended to be to scale. The thickness of the dielectric mirror, for example, is greatly exaggerated.
Figure 1B:
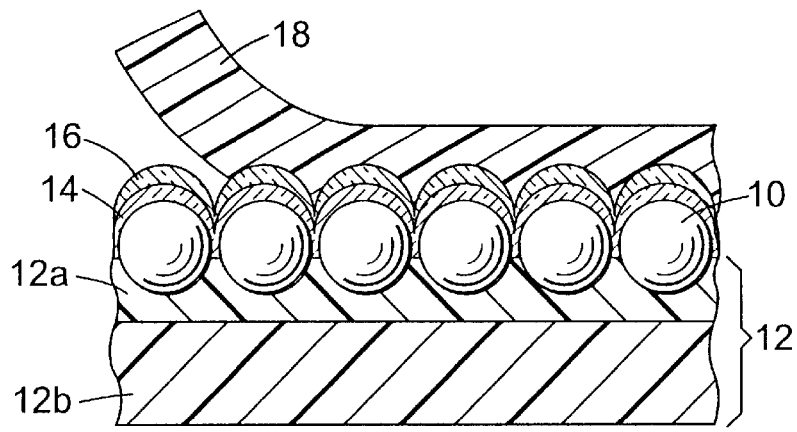
Figure 1C:
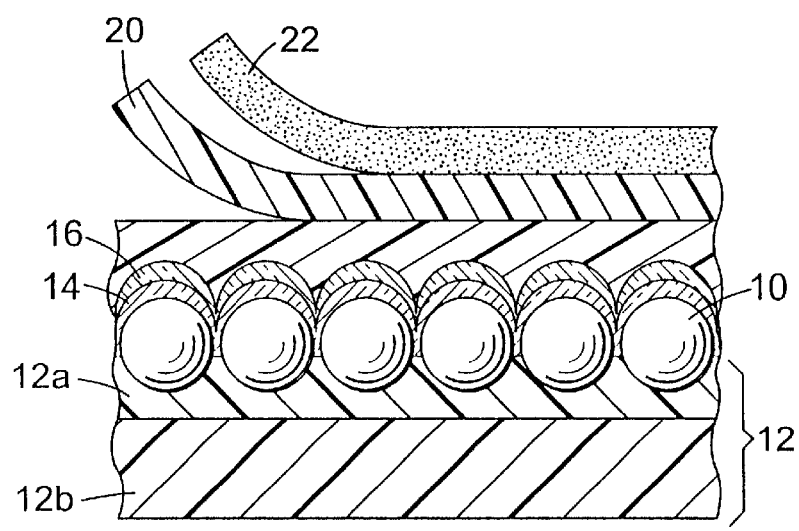
Figure 1D:
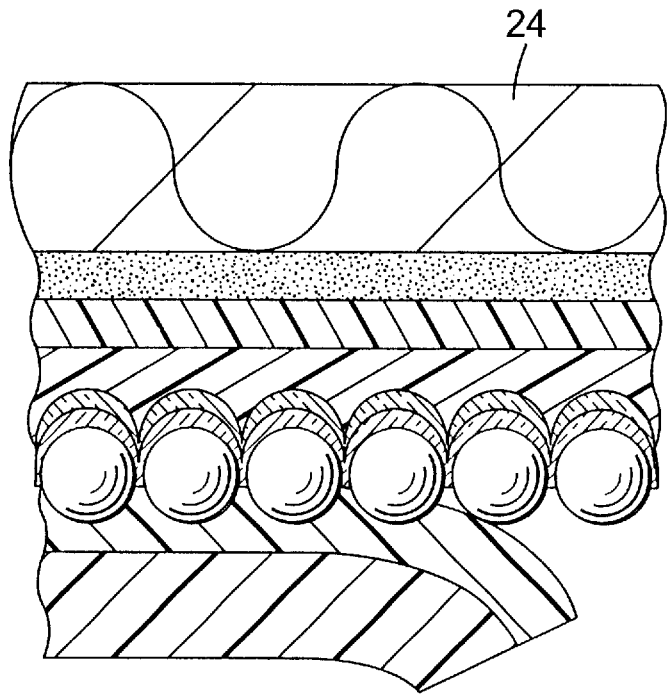

For baseline purposes, several comparative example appliques were prepared. In each example, the monolayer of beads partially embedded in the temporary carrier layer (see items 10 and 12 in FIG. 1a), made in a conventional fashion, was provided with a dielectric mirror by first evaporating a layer of cryolite, followed by evaporating a layer of zinc sulfide. Each evaporation was done in a vacuum environment with the source material (natural cryolite or zinc sulfide, as applicable) being heated sufficiently to cause evaporation. An indirect resistive heating technique was used in both cases, wherein the source material was placed in a graphite holder and electrical current was then applied to heat the graphite material resistively.

The appliques so fabricated, herein designated "CE1", "CE2", "CE3", and "CE4", were then set aside for later treatment with the image-wise bead bond material, application to the fabric substrate, and exposure to home laundering cycles as described above When the bead bond application step and the fabric lamination step were later performed, and the temporary carrier layer was removed, the average initial reflectivity for each example was measured as follows:

TABLE 1

| | CE1 | CE2 | CE3 | CE4 |
|---|---|---|---|---|
| Average Initial Reflectivity in cd/(lux · m$^2$) | ~200 | ~200 | ~155 | ~220 |

Figure 3:
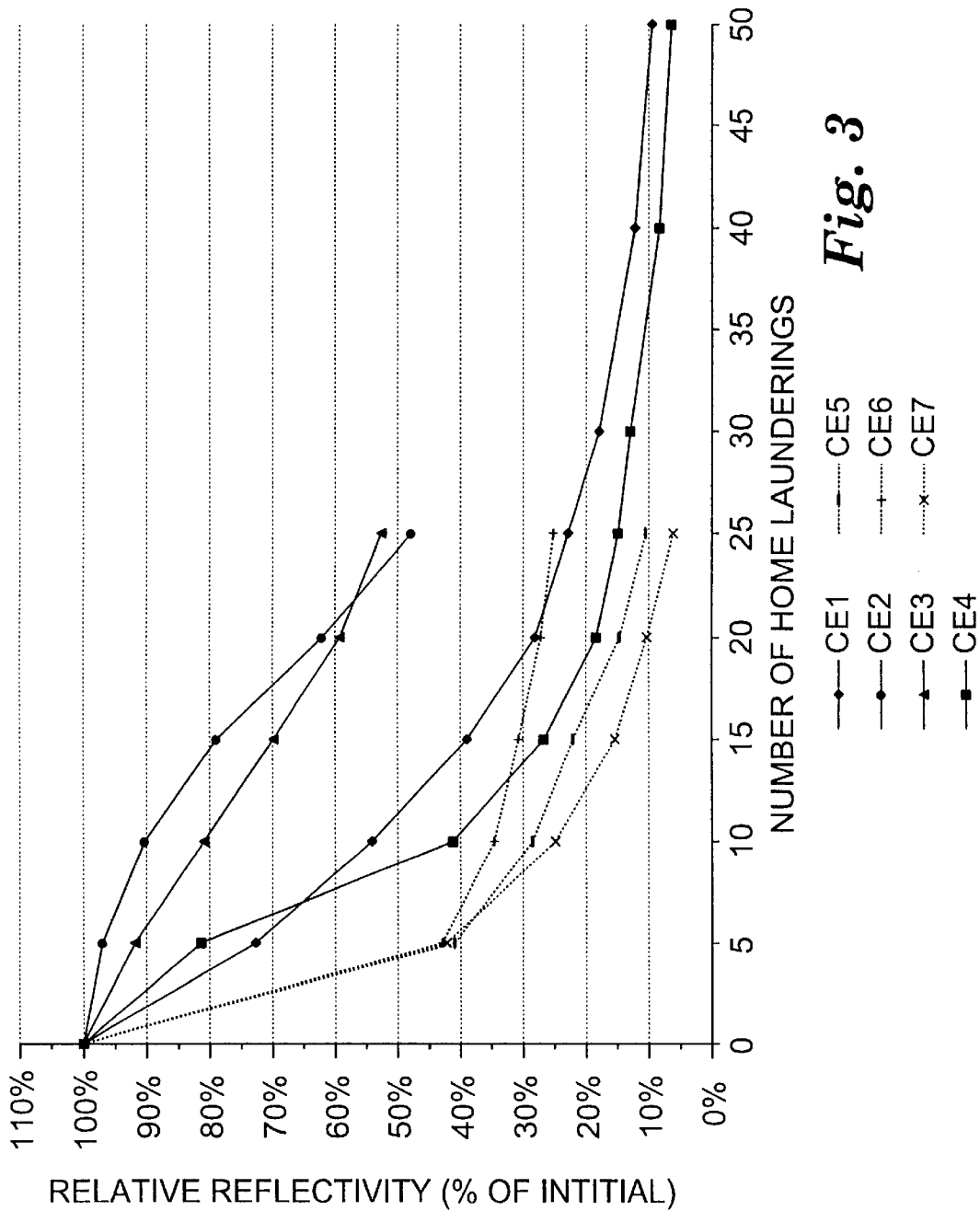
FIG. 3 is a graph of relative reflectivity versus number of home laundering cycles, for comparative example dielectric mirror retroreflective appliques.

Each of these comparative examples was laundered and tested simultaneously with one of the inventive examples described below. The graph of FIG. 3 shows how the relative reflectivity (obtained by dividing the average reflectivity by the average initial reflectivity) of each comparative example degraded as a function of the number of home laundering cycles. The graph plainly shows both the undesirable variability in repetitive laundering performance as well as the overall low retention of reflectivity after about 25 to 50 home laundering cycles.

Comparative Examples 5, 6, and 7

Some additional comparative example exposed lens dielectric mirror appliques were fabricated, this time using magnesium fluoride (MgF$_2$) as the low refractive index dielectric material 14 in place of cryolite. The low index layer of magnesium fluoride was applied by thermal evaporation in a vacuum environment to the monolayer of beads partially embedded in the temporary carrier layer described above in connection with comparative examples 1, 2, 3, and 4. A resistively heated molybdenum boat containing the source magnesium fluoride material was used in the evaporation process. Slightly different thicknesses of magnesium fluoride were deposited, with comparative example 5("CE5") having the smallest thickness and comparative example 7("CE7") having the largest thickness. The high index zinc sulfide layer was then applied in a vacuum environment by directly bombarding the source ZnS material with an electron beam rather than by the process used in CE1 through CE4. However, the image-wise bead bond, fabric substrate, and laundering was carried out in like fashion as described above. The average initial reflectivity of the examples was measured as follows:

TABLE 2

| | CE5 | CE6 | CE7 |
|---|---|---|---|
| Average Initial Reflectivity in cd/(lux · m$^2$) | ~150 | ~120 | ~120 |

The average relative reflectivity, measured over the course of 25 home laundering cycles, is provided in FIG. 3. Consistent with the other comparative examples, these examples also demonstrated a disappointingly low retention of reflectivity after 25 home laundering cycles.

Inventive Examples

Inventive example exposed lens retroreflective appliques were also fabricated and tested. These appliques were fabricated in the same way as the comparative examples, except for the dielectric mirror whose details of construction differed from one example to the other as shown in Table 3:

TABLE 3

|  | Example 1 | Example 2 | Example 3 | Example 4 | Example 5 |
|---|---|---|---|---|---|
| High Index Material 16 | ZnS | ZnS | ZnS | ZnS | ZnS |
| Application Method For Material 16 | evaporation/ resistive heat | evaporation/ e-beam | evaporation/ inductive heat | evaporation/ e-beam | evaporation/ e-beam |
| Low Index Material 14 | $CaF_2$ | $CaF_2$ | $CaF_2$ | $CaF_2$ | $SiO_2$ |
| Application Method for Material 14 | evaporation/ resistive heat | evaporation/ resistive heat | evaporation/ inductive heat | evaporation/ e-beam | evaporation/ e-beam |

Example 1

Some transfer graphic appliques were made as set forth above. Six samples (designated 1a, 1b, 1c, 1d, 1e, and 1f) within this Example 1 were made having slightly different thicknesses of calcium fluoride ($CaF_2$) as the low index material. Samples 1a and 1b had the smallest thickness, samples 1c and 1d had an intermediate thickness, and samples 1e and 1f had the largest thickness. Spectral measurements that were evaluated with a best fit technique yielded estimated thicknesses for sample 1a of about 101 and 68 nm for the $CaF_2$ and ZnS layers respectively, about 137 and 64 nm for the corresponding layers of sample 1c, and about 159 and 75 nm for the corresponding layers of sample 1e. Except for the differences in fabrication noted above, the samples of this Example 1 were all processed and tested together with comparison example CE1: the application of bead bond material 18 was done in the same manner and with the same batch of material; the substrate fabric was the same and was laminated to each applique in the same manner; the samples were all washed simultaneously in the same washing machine and dried simultaneously in the same dryer; and the brightness (reflectivity) measurements were taken at about the same time using the same equipment. The average initial reflectivity of each sample 1a and 1b was between about 140 and 150 cd/(lux·m$^2$); that of each sample 1c and 1d was between about 90 and 95 cd/(lux·m$^2$); and that of each sample 1e and 1f was between about 50 and 55 cd/(lux·m$^2$).

Figure 4:
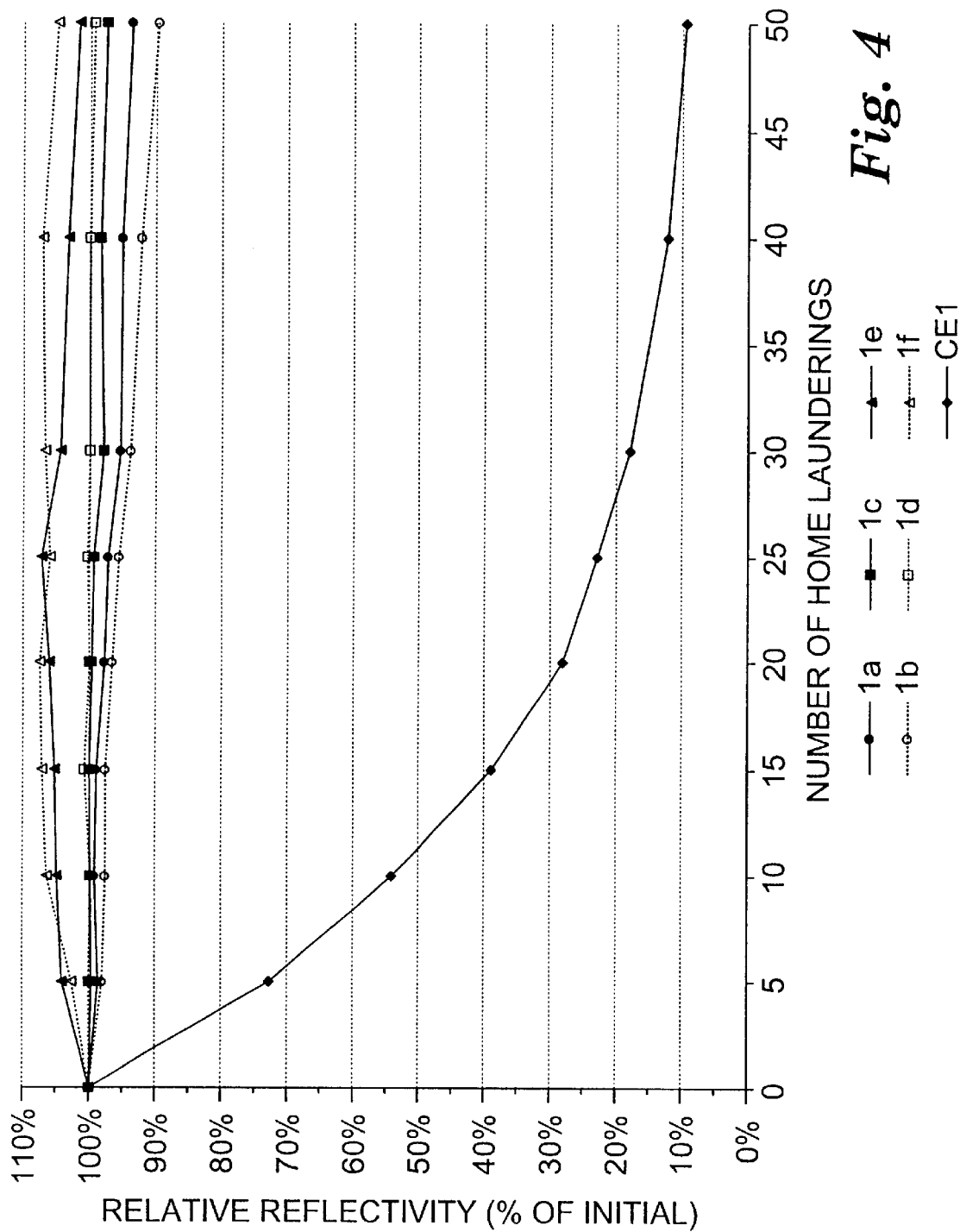
FIGS 4–8 are graphs that show the excellent performance of dielectric mirror retroreflective appliques as disclosed herein when subjected to repetitive home laundering conditions.

FIG. 4 shows the measured relative reflectivity after exposing the samples to fifty home laundering cycles. In this Example 1, each datapoint is an average of five substantially identical samples that were tested. The inventive examples demonstrate excellent retention of reflectivity, each maintaining levels of 95% or more after twenty-five launderings and 90% or more after as many as fifty launderings. The performance of comparative example CE1 is also included in FIG. 4.

Example 2

Figure 5:
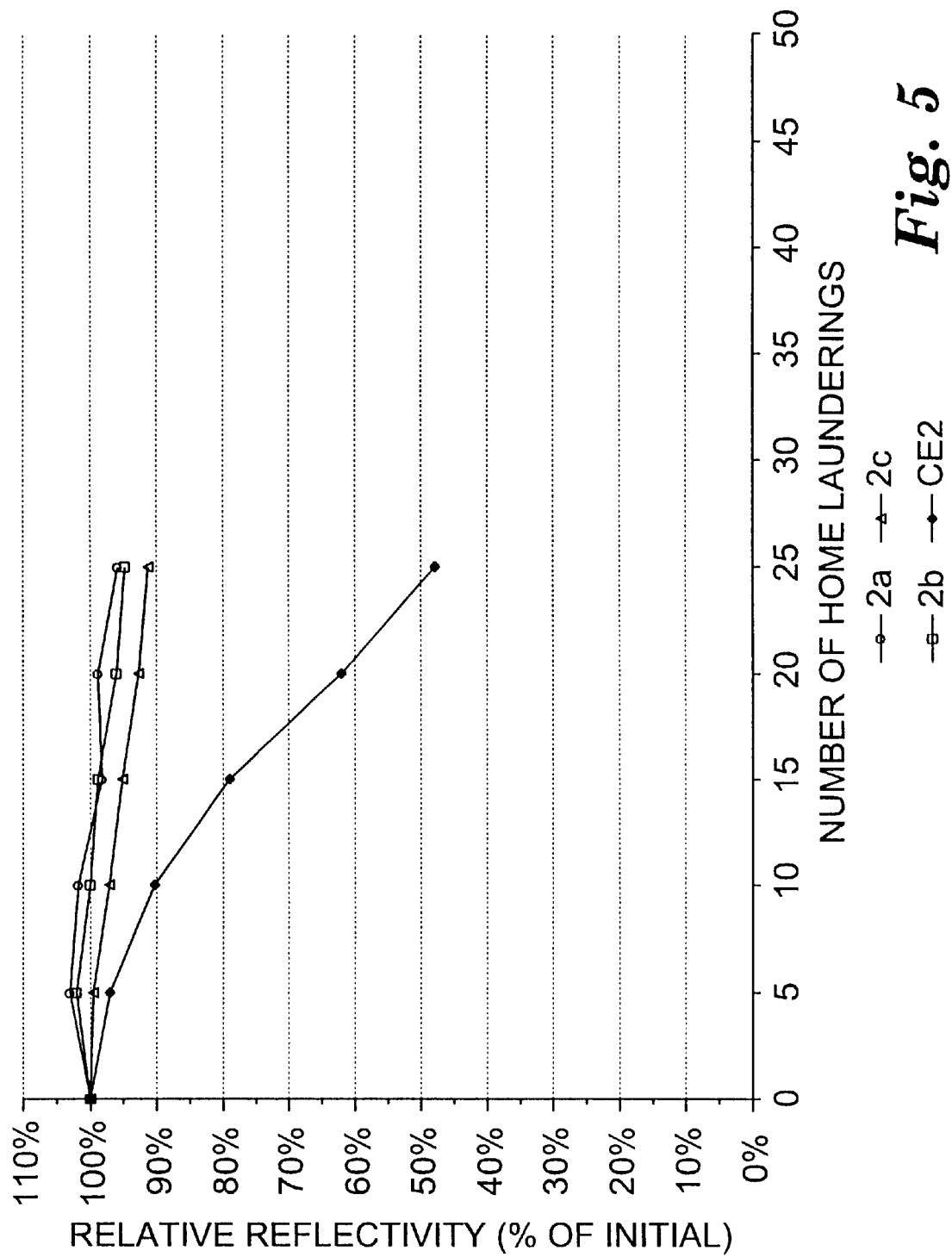

Some more transfer graphic appliques were made as set forth above. Like inventive Example 1, different samples (designated 2a, 2b, and 2c) were made having slightly different thicknesses of the low index material $CaF_2$. Except for the differences in fabrication noted above, the samples of this Example 2 were processed and tested together with comparison example CE2: the application of bead bond material 18 was done in the same manner and with the same batch of material; the substrate fabric was the same and was laminated to each applique in the same manner; the samples were all washed simultaneously in the same washing machine and dried simultaneously in the same dryer; and the brightness (reflectivity) measurements were taken at about the same time using the same equipment. The average initial reflectivity of samples 2a, 2b, and 2c was about 55, 80, and 70 cd/(lux·m$^2$) respectively. Despite these differences, all of the samples showed excellent stability under repetitive home laundering conditions, as shown by the plot of relative reflectivity in FIG. 5. The performance of comparative example CE2 is also included in the figure.

Examples 3, 4

Figure 6:
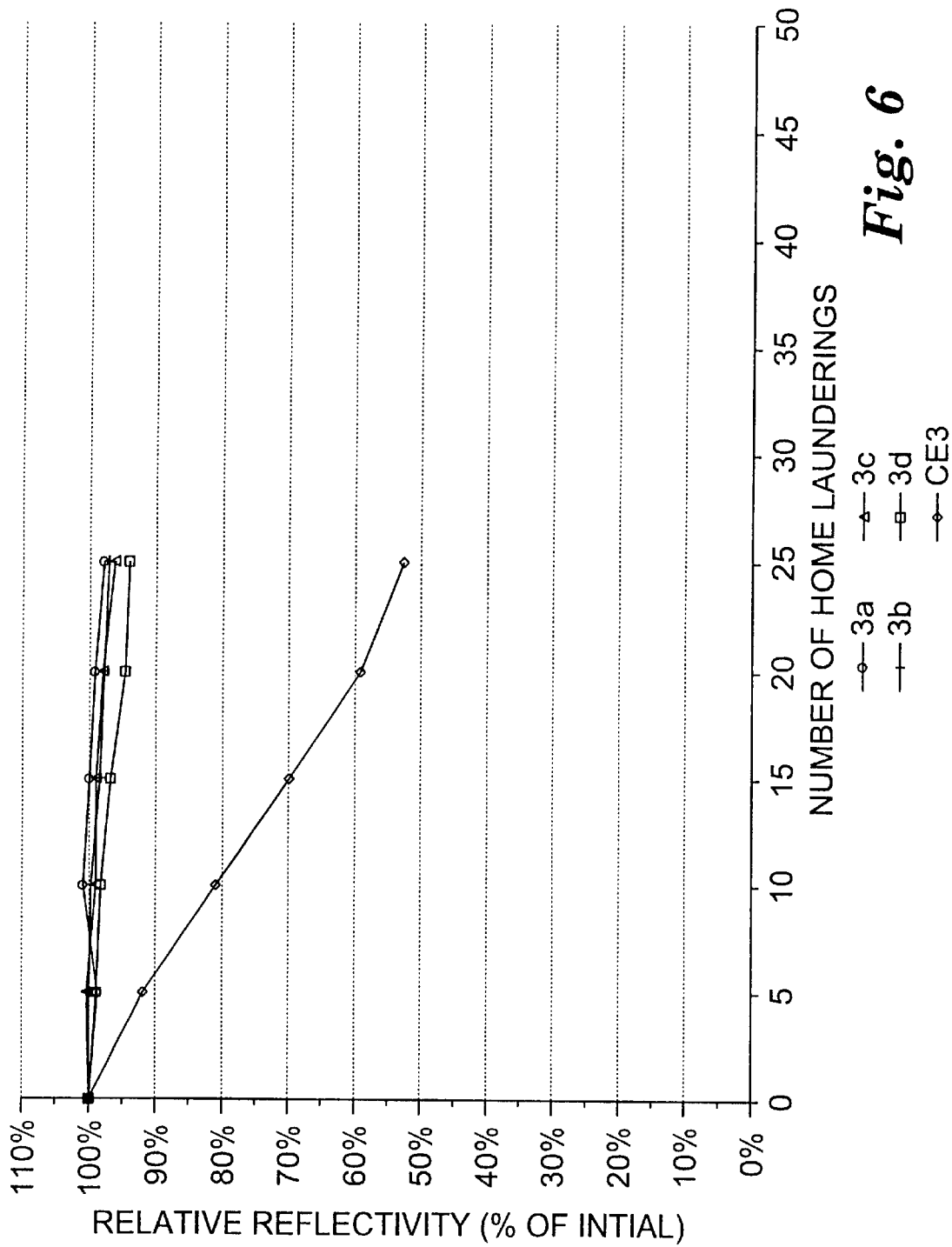
Figure 7:
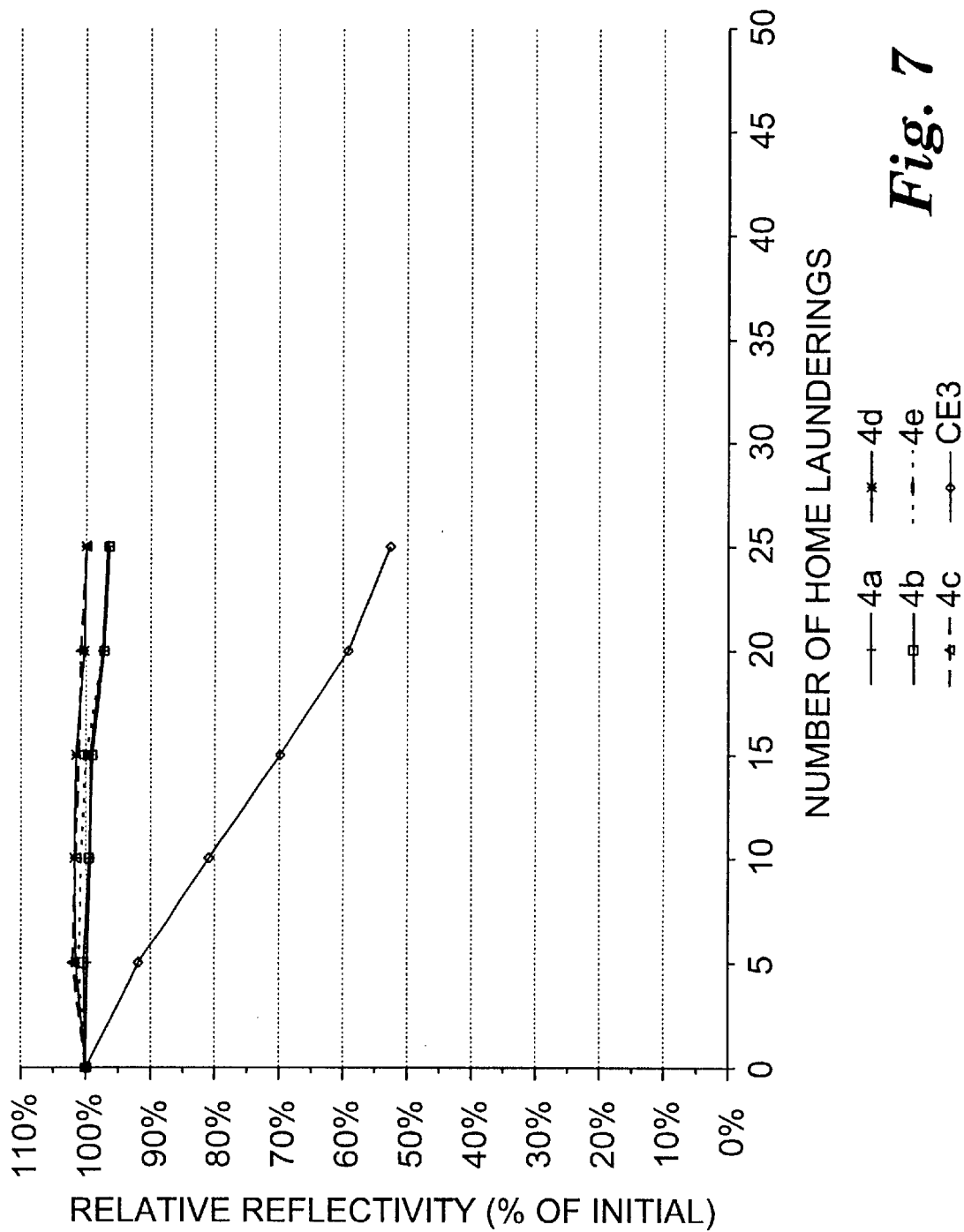

Still more transfer graphic appliques were made as set forth above. Four samples, designated 3a, 3b, 3c, and 3d, were all processed in the same fashion, except that the geometry of the inductively heated holder for the calcium fluoride source material was slightly different for sample 3d. Five more samples, designated 4a through 4e, were made as described in Table 3 by e-beam evaporation of both the high and low index dielectric mirror layers. Except for those differences in dielectric mirror construction, the samples of these Examples 3 and 4 were all processed and tested together with comparison example CE3: the application of bead bond material 18 was done in the same manner and with the same batch of material; the substrate fabric was the same and was laminated to each applique in the same manner; the samples were all washed simultaneously in the same washing machine and dried simultaneously in the same dryer; and the brightness (reflectivity) measurements were taken at about the same time using the same equipment. The average initial reflectivity of the samples 3a, 3b, 3c, and 3d was about 45, 65, 60, and 110 cd/(lux·m$^2$) respectively. The average initial reflectivity of samples 4a, 4b, 4c, 4d, and 4e was about 95, 130, 75, 90, and 75 cd/(lux·m$^2$) respectively. Again, despite the differences in initial reflectivity, the inventive samples consistently demonstrated excellent stability under repetitive home laundering conditions, as shown by the plot of relative reflectivity in FIGS. 6 and 7. The performance of comparative example CE3 is also included in the figures.

Example 5

Another transfer graphic applique sample was made as set forth above. As seen in Table 3, e-beam vacuum deposited silicon dioxide was used as a low index material rather than calcium fluoride. The high index layer was e-beam vacuum deposited zinc sulfide. Except for the differences in dielectric mirror fabrication, the sample of this Example 5 was processed and tested together with comparison example CE4: the application of bead bond material 18 was done in the same manner and with the same batch of material; the substrate fabric was the same and was laminated to each applique in the same manner; the samples were all washed simultaneously in the same washing machine and dried simultaneously in the same dryer; and the brightness (reflectivity) measurements were taken at about the same time using the same equipment.

Figure 8:
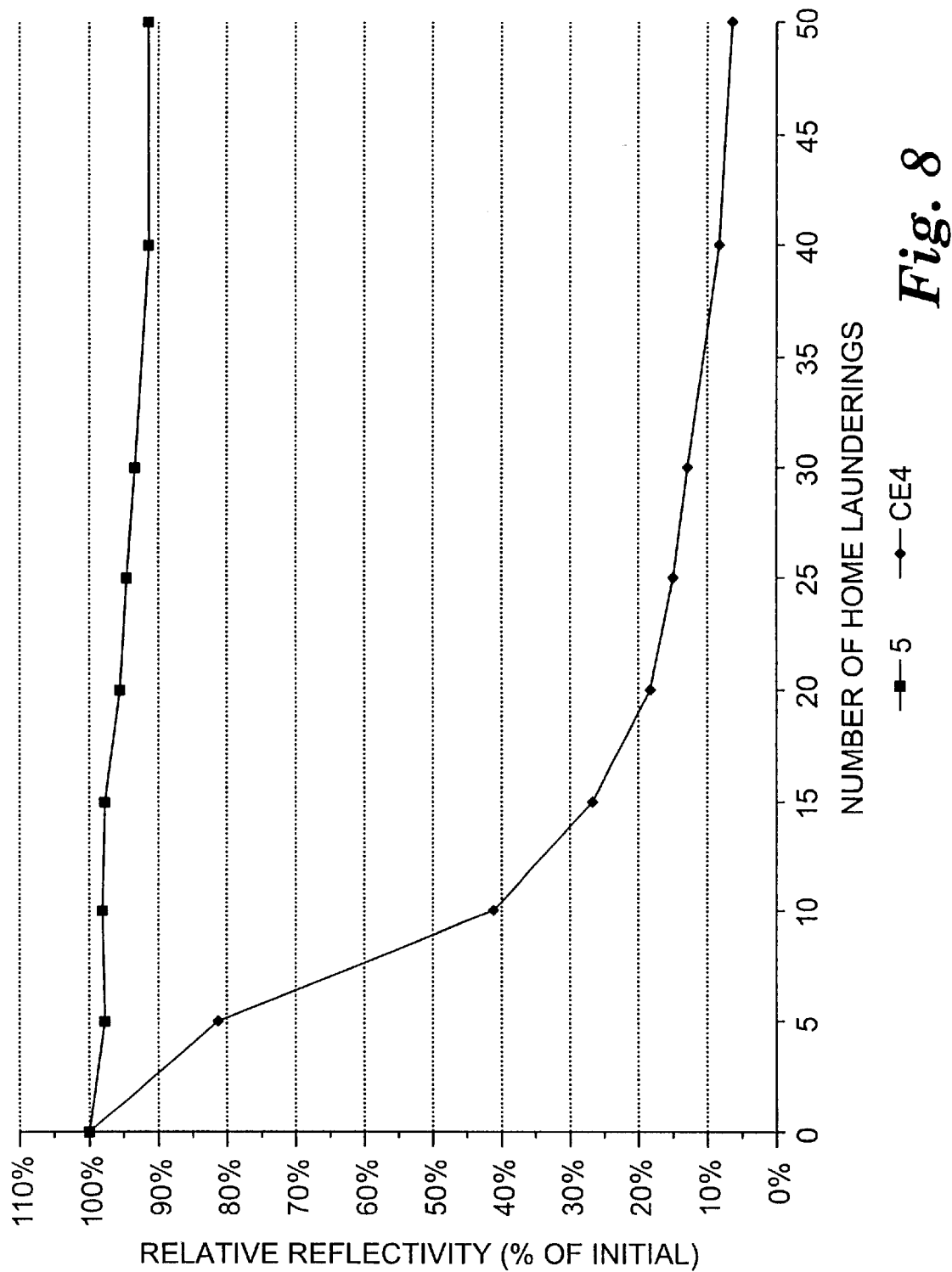

This Example 5 sample had an average initial reflectivity (averaging 4 substantially identical individual samples) of about 185 cd/(lux·m$^2$). The average relative reflectivity when subjected to fifty home laundering cycles is shown in FIG. 8. As with the other inventive examples, this Example 5 applique demonstrated excellent retention of reflectivity, over 90% even after all of the laundering cycles. The curve for comparative example CE4 is also included in the figure.

The invention has thus been described by way of the foregoing examples. However, the invention is not limited to the exact appliques that were fabricated and tested, but instead is defined only by the scope of the claims that appear below. Various applique constructions are contemplated, including (but not limited to) appliques that are affixed to a fabric or other substrate and those that are not, appliques that have distinct bead bond, barrier coat, and adhesive layers, appliques that do not have a separate barrier coat or adhesive layer, appliques that have an image-wise bead bond layer as well as those that have a continuous bead bond layer, and appliques that have not yet been provided with a bead bond layer. Dielectric mirrors that consist essentially of a number of distinct layers other than two, such as three, four, or more, are contemplated. Additional layers (whether continuous or patterned to form an image such as a graphic) can be provided on the monolayer of beads between the beads and the dielectric mirror layers. The bead bond chemistry can comprise suitable polyurethanes, polyesters, epoxies, phenolics, polyolefins, acrylics, polyamides, polyethers, polyimides, polyvinyl halides, and nitrile rubbers. The bead bond material can be applied to the monolayer of beads by conventional manufacturing methods such as continuous roll coating, knife coating, or printing. If desired, the bead bond can be printed in an image-wise fashion or otherwise applied to make image-wise patterns using a variety of ink formulations such as 100% solids inks (including plastisol inks), solvent-based inks, or water-based inks. The bead bond can also include various additives including colorants, heat stabilizers, adhesion promoters, flame retardants, UV absorbers, processing aids, antioxidants, and volatile diluents.

Glossary of Selected Terms

"Applique" means a sheeting material having a desirable visual property that is applied or that can be applied (e.g. by addition of a suitable bead bond material) to the surface of a personal article. "Applique" thus includes, but is not limited to, a transfer sheet suitable for application to a substrate that is used in a personal article, as well as a graphic image residing on the surface of a personal article without any temporary carrier layer.

"Home laundering cycle" means a wash/rinse cycle in a Maytag™ Model LS7804 automatic washing machine or equivalent, with settings of "Regular" fabric (setting 10), "Large" load, and "Hot/Cold" for wash/rinse temperature, using an initial (hot) water temperature of about 43° C., and using about 30 grams of standard detergent obtained from the American Association of Textile Chemists and Colorists (AATCC) Technical Center, P.O. Box 12215, Research Triangle, N.C. 27709, and also using a sufficient amount of cotton ballast towels during the wash/rinse cycle such that the dry weight of the sample(s) being tested plus that of the ballast towels equals about 4 lbs (about 1.8 kg). Additionally, if five or more home laundering cycles are referred to, then "home laundering cycle" also includes, after approximately every fifth wash/rinse cycle, a drying cycle in which the sample under test together with the ballast towels are tumble-dried in a Maytag™ Model LS7804 dryer or equivalent using the settings of 60° C. temperature and "Regular" fabric and then tumbled for a 5 to 10 minute cooling period in the dryer with the heat turned off.

"Personal article" means an article that is used on or by individual persons, and includes but is not limited to shirts, vests, sweaters, jackets, coats, pants, shoes, socks, gloves, belts, hats, suits, one-piece body garments, and other articles of clothing, as well as personal accessories such as backpacks and handbags.

"Reflectivity" of an article is a measure of the apparent brightness of the article when viewed under standard retroreflective conditions (i.e., −4° entrance angle, and 0.2° observation angle), which brightness is normalized for the area of the article and the illumination from the light source used. The reflectivity is also referred to as the coefficient of retroreflection ($R_A$), and is expressed in units of candelas per lux per square meter (cd/(lux·m$^2$)) Reference is made to ASTM Standard Method E808-99, "Standard Practice For Describing Retroreflection".

A "retroreflective" article is one that exhibits or that can exhibit a reflectivity of at least about about 1 cd/(lux·m$^2$). An applique that is a transfer sheet is considered retroreflective even though the sheet becomes retroreflective only after application to a substrate and removal of a temporary carrier sheet that otherwise covers the retroreflective elements.

What is claimed is:

1. An exposed lens retroreflective applique, comprising:
   a monolayer of beads partially embedded in a first layer; and
   a dielectric mirror disposed proximate the monolayer of beads such that the beads and the dielectric mirror cooperate to retroreflect light;
      wherein the applique exhibits an initial reflectivity and, if subjected to fifty home laundering cycles, a second reflectivity, and wherein the second reflectivity is at least 75% of the initial reflectivity.

2. The applique of claim 1, wherein the second reflectivity is at least 90% of the initial reflectivity.

3. The applique of claim 1, wherein after the first twenty-five of the fifty home laundering cycles the applique exhibits a third reflectivity, and the third reflectivity is at least 90% of the initial reflectivity.

4. The applique of claim 1, wherein the dielectric mirror includes at least one layer of a relatively high refractive index material and at least one layer of a relatively low refractive index material.

5. The applique of claim 4, wherein the relatively high refractive index material comprises zinc sulfide and the relatively low refractive index material comprises a material selected from the group consisting of calcium fluoride and silicon dioxide.

6. The applique of claim 1, wherein each home laundering cycle comprises:
   a wash/rinse cycle in a Maytag™ Model LS7804 automatic washing machine or equivalent, with settings of "Regular" fabric, "Large" load, and "Hot/Cold" for wash/rinse temperature, using an initial water temperature of about 43° C., and using about 30 grams of standard detergent, and further using a sufficient amount of cotton ballast towels such that the dry weight of the sample(s) being tested plus that of the ballast towels equals about 4 pounds;

and wherein approximately every fifth home laundering cycle also comprises a drying cycle in which the sample under test together with the ballast towels are tumble-dried in a Maytag™ Model LS7804 dryer or equivalent using the settings of 60° C. temperature and "Regular" fabric and then tumbled for a 5 to 10 minute cooling period in the dryer with the heat turned off.

7. The applique of claim 1, wherein the first layer is a bead bond material that comprises a plastisol ink.

8. The applique of claim 1, wherein the first layer comprises a bead bond material, the applique further including a fabric such that the bead bond material is disposed between the fabric and the monolayer of beads.

9. The applique of claim 1, wherein the first layer comprises a temporary carrier layer.

10. An exposed lens retroreflective applique, comprising:
   a monolayer of beads partially embedded in a first layer; and
   a dielectric mirror disposed proximate the monolayer of beads such that the beads and the dielectric mirror cooperate to retroreflect light;
      wherein the applique exhibits an initial reflectivity and, if subjected to twenty-five home laundering cycles, a second reflectivity, and wherein the second reflectivity is at least 90% of the initial reflectivity.

11. An exposed lens retroreflective applique, comprising:
   a monolayer of beads; and
   a dielectric mirror disposed proximate the monolayer of beads such that the beads and the dielectric mirror cooperate to retroreflect light, the dielectric mirror comprising at least one layer of a relatively high refractive index material and at least one layer of a relatively low refractive index material;
      wherein the relatively high refractive index material comprises zinc sulfide and the relatively low refractive index material comprises a material selected from the group consisting of calcium fluoride and silicon dioxide; and
   wherein the applique has an initial reflectivity associated therewith and wherein the applique retains at least 75% of the initial reflectivity if subjected to fifty home laundering cycles.

12. An exposed lens retroreflective applique, comprising:
   a monolayer of beads; and
   a dielectric mirror disposed proximate the monolayer of beads such that the beads and the dielectric mirror cooperate to retroreflect light, the dielectric mirror comprising at least one layer of a relatively high refractive index material and at least one layer of a relatively low refractive index material;
      wherein the relatively high refractive index material comprises zinc sulfide and the relatively low refractive index material comprises a material selected from the group consisting of calcium fluoride and silicon dioxide; and
      wherein the applique has an initial reflectivity associated therewith and wherein the applique retains at least 90% of the initial reflectivity if subjected to twenty-five home laundering cycles.

13. A launderable exposed lens retroreflective applique, comprising:
   a carrier layer;
   a layer of bead bond material;
   a monolayer of beads partially embedded in the carrier layer and partially embedded in the bead bond material; and
   a dielectric mirror disposed proximate the monolayer of beads such that the beads and the dielectric mirror cooperate to retroreflect light, the dielectric mirror comprising at least one layer of a relatively high refractive index material and at least one layer of a relatively low refractive index material;
   wherein the relatively high refractive index material comprises zinc sulfide and the relatively low refractive index material comprises a material selected from the group consisting of calcium fluoride and silicon dioxide; and
   wherein the applique has an initial reflectivity associated therewith and wherein the applique retains at least 75% of the initial reflectivity if subjected to 50 home laundering cycles.

14. The applique of claim 13, wherein the bead bond material comprises a plastisol ink.

* * * * *